United States Patent
Raivo et al.

(10) Patent No.: US 6,299,830 B2
(45) Date of Patent: Oct. 9, 2001

(54) APPARATUS AND METHOD FOR TAPPING A FURNACE

(75) Inventors: Brian D. Raivo; Gary V. Buss; Mitchell R. Greenhalgh, all of Idaho Falls, ID (US)

(73) Assignee: MelTran, Inc., Idaho Falls, ID (US)

( * ) Notice: Subject to any disclaimer, the term of this patent is extended or adjusted under 35 U.S.C. 154(b) by 0 days.

(21) Appl. No.: 09/159,280

(22) Filed: Sep. 22, 1998

(51) Int. Cl.$^7$ .................................................. C21C 5/48

(52) U.S. Cl. ............................. 266/272; 266/45; 266/47

(58) Field of Search ............................. 266/45, 47, 271, 266/272

(56) References Cited

U.S. PATENT DOCUMENTS

| | | |
|---|---|---|
| 940,561 | 11/1909 | Seward . |
| 968,984 | 8/1910 | Ringland . |
| 1,186,358 | 6/1916 | Witz . |
| 3,667,748 | 6/1972 | Dienenthal et al. . |
| 3,845,809 | 11/1974 | Pomey . |
| 4,030,709 | 6/1977 | Shepard et al. . |
| 4,037,828 | 6/1977 | Terada et al. . |
| 4,081,178 | 3/1978 | Kopperstad et al. . |
| 4,273,202 | 6/1981 | Phillips et al. . |
| 4,335,265 | 6/1982 | Roberge et al. . |
| 4,336,922 | 6/1982 | Immekus . |
| 4,341,547 | 7/1982 | Heimerl . |
| 4,378,054 | 3/1983 | Bourcier et al. . |
| 4,384,706 | 5/1983 | Shirasaka et al. . |
| 4,399,986 | 8/1983 | Collins . |
| 4,418,894 | 12/1983 | Mailliet . |
| 4,457,459 | 7/1984 | Bates et al. . |
| 4,544,143 | 10/1985 | Cooper et al. . |
| 4,565,525 | 1/1986 | Van Laar et al. . |
| 4,602,770 | 7/1986 | Mailliet et al. . |
| 4,637,590 | 1/1987 | Schneider . |
| 4,639,927 | 1/1987 | Uno et al. . |
| 4,645,534 | 2/1987 | D'Angelo et al. . |
| 4,679,773 | 7/1987 | Wunsche . |
| 4,786,250 | 11/1988 | Cooper et al. . |

(List continued on next page.)

FOREIGN PATENT DOCUMENTS

| | | |
|---|---|---|
| 245603 | 7/1963 | (AU) . |
| 12 00 481 B | 9/1965 | (DE) . |
| 34 27 940 A1 | 2/1986 | (DE) . |
| 36 13 894 A1 | 10/1987 | (DE) . |
| 38 43 545 A1 | 6/1991 | (DE) . |
| 566 634 A | 2/1924 | (FR) . |
| 704 745 A | 5/1931 | (FR) . |
| 2210151 | 6/1989 | (GB) . |
| WO 92 04998 A | 4/1992 | (WO) . |
| WO 98/09481 | 3/1998 | (WO) . |
| WO 98/27790 | 6/1998 | (WO) . |

OTHER PUBLICATIONS

Amstead, B.H. "Mechanical Process," pp. 239–250 (no translation available). No date.

*Primary Examiner*—Scott Kastler
(74) *Attorney, Agent, or Firm*—Morrison & Forester LLP (57) ABSTRACT

An apparatus and method for controlling the flow of molten material from a melt container. The apparatus includes a tubular insert sized for insertion into a tap hole formed in a sidewall of the melt container and a rod receivable within the insert. A cooling device is provided to cool the rod to a temperature below the temperature of the molten material. The rod is axially movable within the insert between a first position wherein the rod is positioned within the tubular insert for cooling a portion of the molten material located at the first end of the insert to form a plug and stop the flow of molten material through the passageway, and a second position wherein the rod is spaced from the first end of the insert to allow the plug to melt and start the flow of molten material through the passageway. A method for trapping gases emitted during the melt and tapping processes is also disclosed.

19 Claims, 6 Drawing Sheets

U.S. PATENT DOCUMENTS

| | | |
|---|---|---|
| 4,795,066 | 1/1989 | Worrel . |
| 4,871,000 | 10/1989 | Ritter . |
| 4,872,897 | 10/1989 | Krejci et al. . |
| 4,895,349 | 1/1990 | Broom . |
| 4,909,487 | 3/1990 | Schneider . |
| 4,960,379 | 10/1990 | Schneider . |
| 5,005,807 | 4/1991 | Mathews et al. . |
| 5,254,829 | 10/1993 | Drouet . |
| 5,271,539 | 12/1993 | Ozawa et al. . |
| 5,305,990 | 4/1994 | Sherwood . |
| 5,308,047 | 5/1994 | Lonardi et al. . |
| 5,820,815 * | 10/1998 | George ................................. 266/45 |

* cited by examiner

APPARATUS AND METHOD FOR TAPPING A FURNACE

FIELD OF THE INVENTION

The present invention relates to the tapping of molten metal furnaces, and more particularly, to the removal of molten basaltic type slags and metals from high temperature plasma arc furnaces and the confinement of fumes generated during the removal.

BACKGROUND OF THE INVENTION

High temperature plasma arc melters are traditionally utilized for the production of irons and steels and for other extractive metallurgy purposes. Recent developments in the usage of plasma arc melters for the processing of minerals and waste material have generated a need for improved methods of removing molten basalt from the primary melting chamber.

Basaltic slags and reduced metals are produced from waste type arc furnaces at temperatures nominally in the range of 1500° C. to 2000° C. Basaltic slag are generally viscous in nature even at high temperatures and are very corrosive. The viscous nature of these slags presents difficulties in removal of the product from the melter. One standard method to aid in the removal is to add fluxing agents such as alkali metals Na, K etc.) or alkali earth metals (Ca, Mg, etc.) to chemically change the composition and reduce the viscosity for a given temperature range. However, it is often desirable to minimize the addition of fluxing agents to the melt for economic and product specification purposes.

Another method used is raising the temperature of the melt a sufficient amount to ensure a flowable liquid as the liquid progresses through an opening in the melter (removal means). Alternately, heat may be added to the removal means to ensure a flowable liquid stream. The temperature of the melt must be sufficient to provide a flowable fluid through the product removal means (taphole or weir) to remove a generally viscous product. Complications arise due to the fact that basaltic slags generally remain viscous above 1535° C. (melting point of iron) and are very corrosive and acidic. The acidic nature of these slags often precludes the use of standard components generally used in the iron and steel industry which are commonly available.

Electrically fired plasma torches are currently used for the processing of minerals and waste material. These torches tend to operate in the 5,000° C. to 10,000° C. range at the torch with bath temperatures approaching greater than 2500° C. in the hot areas. Graphite electrode plasma arc furnaces may be operated in very short arc or submerged orientations and tend to operate at slightly lower bath temperatures in the range of 1500° C. to 2000° C. Operations with higher bath temperatures provide the ability for greater control of viscosity, but result in energy and maintenance penalties. Operations with a bath temperature just high enough to encourage chemical reactions and the production of basaltic type material provide economic and maintenance advantages but complicate the removal of the basaltic slag product.

Molten material is generally removed from the furnaces by tipping the furnace and pouring the material over a spout, by opening a tap hole located in the side or bottom of the funiace, or by flowing the material under and over weir structures located at the bottom of the furnace. Eccentric bottom tapping is generally standard practice for tapping electric arc furnaces used in the production of steel. Molten material is generally removed from blast furnaces by drilling out a plug of material located in a hole through a sidewall in the furnace.

Typically, the molten material is removed in a batch operation in which nearly all of the molten material is drained from the furnace once the hole is tapped. In industrial use this method provides a relatively simple and inexpensive method for product removal. However, it is often desirable to start and stop the molten stream rather than dispense all of the molten material at one time. This requires opening, closing, and maintenance of the tap hole and difficult control of fugitive emissions from the hole. The hole is generally closed with a disposable plug, ram gun, ramming paste or mixture, or other type of mechanical closures. These closures are often difficult to install and remove and may be susceptible to leaks.

Therefore, there is currently a need for a tapping apparatus and method which creates a tap hole which can be repeatedly opened and closed, and a method for confining fumes generated when the tap hole is opened during the removal of the molten material from the furnace.

SUMMARY OF THE INVENTION

The present invention involves a method and apparatus for removing molten materials from high temperature furnaces and the confinement of flames generated during the removal. The invention provides controlled opening and closing of a tap hole in the furnace and allows for repeated starting and stopping of a molten stream.

An apparatus of the present invention is used for controlling the flow of molten material from a melt container having a tap hole formed in a sidewall of the container. The apparatus generally comprises a tubular insert sized for insertion into the tap hole, a rod receivable within the insert and a cooling device for cooling the rod to a temperature below the temperature of the molten material. The insert has a first end for insertion into the molten material, a second end, and a fluid passageway extending between the first and second ends. The rod is longitudinally movable between a first position wherein the rod is positioned within the tubular insert for cooling a portion of the molten material through the passageway, and a second position wherein the rod is spaced from the first end of the insert to allow the plug to melt and start the flow of molten material through the passageway.

According to one aspect of the invention, the rod is formed of copper and the cooling device comprises a passageway extending along at least a portion of the rod for flowing fluid within the rod. The high thermal conductivity of the copper draws heat away from the molten material to a cooling medium. The continuous cooling of the copper pin by a heat transfer fluid and a heat sink causes the plug to remain intact during the high temperature melting process. The geometry of the rod and insert and penetration of the cooled rod into the insert are important factors in the formation of the plug and a button (body) of solidified material within the higher temperature molten bath. The removal of the rod with subsequent stoppage of cooling of the plug and button within the insert causes the solidified button to heat up and melt back into the molten bath. This causes an initiation of a molten basalt tap stream through the insert.

A tapping system of the present invention generally comprises a melt container for melting a material, a tapping mechanism operable to start and stop flow from the container, a housing interposed between the tapping mechanism and melt container, and a conduit having a first end connected to the housing and a second end connected to an upper chamber of the melt container. The system further comprises a vacuum source connected to the upper chamber of the melt container to draw off gases generated during the melting and tapping processes from the container and housing.

According to another aspect of the invention, a method of controlling flow of molten material from a container comprises inserting a rod into the tubular insert, cooling the rod below the temperature of the molten material, and forming a solid plug from molten material at a first end of the rod assembly by cooling a portion of the molten material, thereby stopping the flow of molten material through the tubular insert in the container. In one embodiment, the method employed utilizes a chilled copper insertion rod to cool and solidify a plug of basalt within the insert.

According to yet another aspect of the present invention, a method of molding an object from a high alumina-chrome plastic refractory comprises: filling a mold with the material; applying pressure to the mold; relieving pressure from the mold; heating the mold to solidify the object; removing the material from the mold; and heating the material. The mold is preferably heated at 200° F. for approximately 24 hours and the material is subsequently cured after removal from the mold to 1600° C.

The above is a brief description of some deficiencies in the prior art and advantages of the present invention. Other features, advantages, and embodiments of the invention will be apparent to those skilled in the art from the following description, accompanying drawings, and claims.

BRIEF DESCRIPTION OF THE DRAWINGS

Corresponding reference characters indicate corresponding parts throughout the several views of the drawings.

DESCRIPTION OF THE INVENTION

Figure 1A:
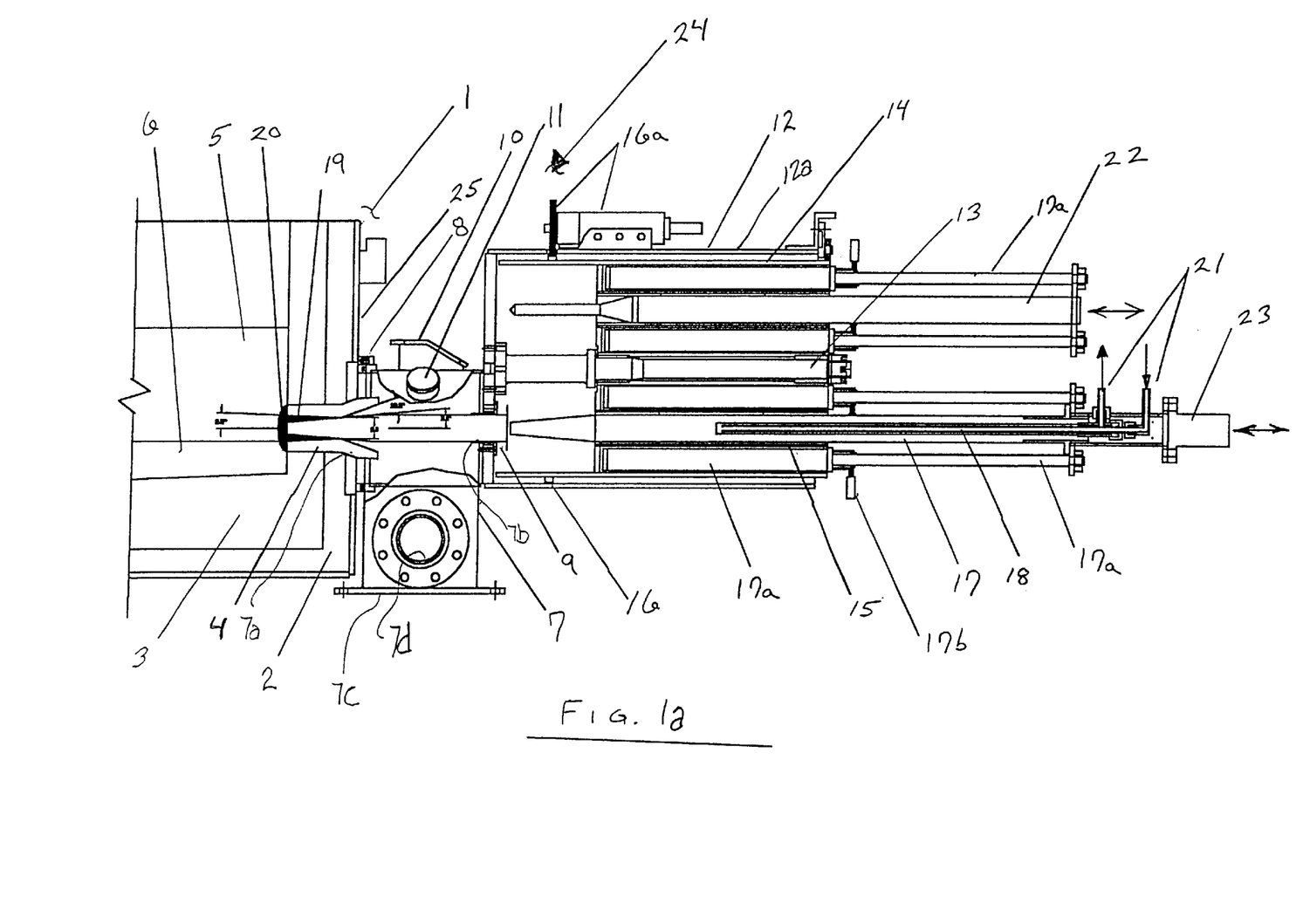
FIG. 1a is a cross-sectional view of a melt crucible, tap chamber, and tapping mechanism of the present invention.

Referring now to the drawings and in particular to FIG. 1a, a tapping apparatus constructed according to the principles of the present invention is indicated generally at 24. The tapping apparatus comprises a tapping mechanism 12 and a tapping chamber 7 configured for engagement with a melt crucible (container) 1. The tapping apparatus controls the flow of molten material such as molten basaltic type slag from high temperature plasma arc furnaces and confines fumes generated during the removal.

FIG. 1a shows a cross-sectional view of the melt crucible 1 and tapping mechanism 24. The melt crucible 1 is lined with an insulating refractory 2 and a working refractory 3, and contains a molten basalt layer 5 and molten metal layer 6. The insulating refractory 2 is made from a standard high alumina material commonly used in insulating refractories. The working refractory 3 is made from a plastic refractory material having a high alumina-chrome refractory (such as RUBY® plastic available from Indresco, Inc. of Pittsburgh, Pa.) in a brick, plastic, or ram form. The high alumina content gives high temperature resistance and the chrome provides corrosion resistance. This high alumina-chrome plastic refractory material is commonly used in working refractories. The crucible has a taphole formed in a sidewall thereof for receiving a tubular taphole insert 4. The insert 4 is preferably cemented to the working refractory 3 and insulating refractory 2.

Figure 1B:
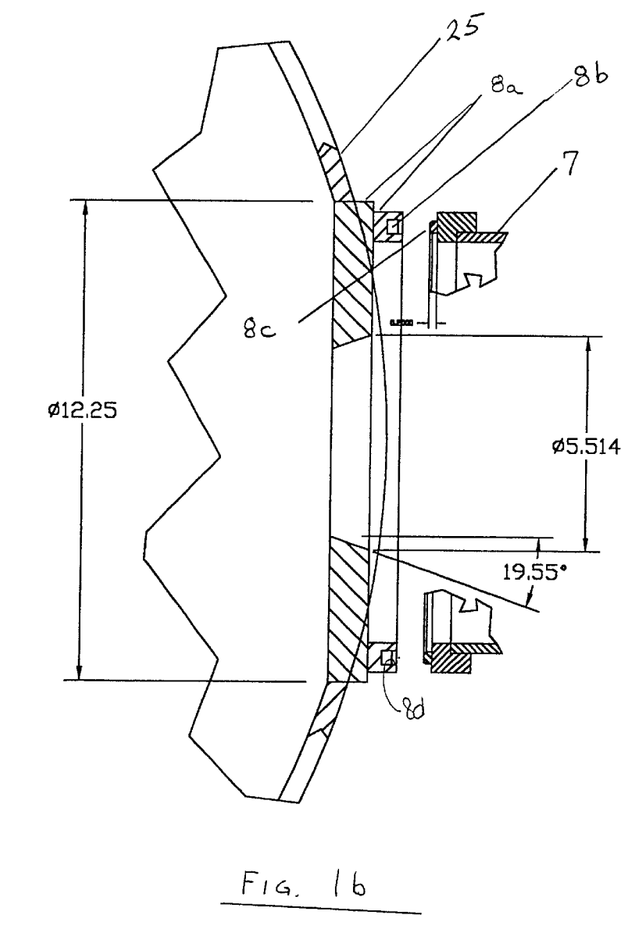
FIG. 1b is a cross-sectional partial view of the tap chamber and melt crucible of FIG. 1.

The tapping chamber 7 is interposed between the tapping mechanism 12 and crucible 1 and includes a first opening 7a for fluid communication with the crucible, a second opening 7b for receiving a tapping rod 17 from the tapping mechanism 12, and a third opening 7c for delivering the molten material. The insert 4 is received within the first opening 7a of the chamber 7. A bushing 9 forms a passageway extending from the first opening 7a to the second opening 7b of the chamber 7. The chamber 7 is sealingly attached to the sidewall of the crucible 1 at the location of the taphole. A locating flange 8a extends around the periphery of the taphole and includes a groove 8d for receiving a rib 8c protruding from the tapping chamber 7 at the location of the first opening 7a (FIGS. 1a and 1b). A compressible seal 8b is preferably disposed within the groove 8d to prevent the escape of gas from between the mating surfaces of the chamber 7 and crucible 1. Quick disconnect over-center toggle clamps (not shown) are used to draw the chamber 7 towards the crucible 1 and sealingly engage the chamber to the crucible. It is to be understood that other types of clamps, flanges, or seal configurations may be used without departing from the scope of the invention.

The chamber 7 further includes a sample port 7d in the chamber sidewall, an access port 10 at the top of the chamber for mounting a camera to monitor tapping operations and a vacuum port 11 on a sidewall of the tapping chamber for connection of a vacuum duct 33, as described below.

The tapping mechanism 12 includes a cylindrical housing 12a which is connected to the tapping chamber 7 opposite the location of the crucible 1. The housing 12a is preferably bolted to the chamber 7. A bushing 9 extends from the second opening 7b in the chamber 7 into a similarly sized opening in one end of the housing 12a. A drum 14 is disposed within the housing 12a and rotatably mounted on a shaft 13. The rotating drum 14 includes axial bearing tubes 15 located equidistant from the center shaft 13. The bearing tubes 15 are aligned axially with the bushing 9 and the taphole insert 4 by indexing the drum 14 into position via a ring gear 16 located on the drum exterior and an indexing motor/gear arrangement 16a.

The tapping mechanism further includes a tapping rod 17 which is axially driven through the tapping chamber 7 and into the taphole insert 4. The rod 17 is preferably driven by a pneumatic cylinder 17a having an operating pressure of 150 psi. The air cylinder 17a preferably has a stroke of 20 inches and is controlled by an electrically actuated solenoid control valve 17b, although the invention is not limited to a particular stroke length.

Figure 2:
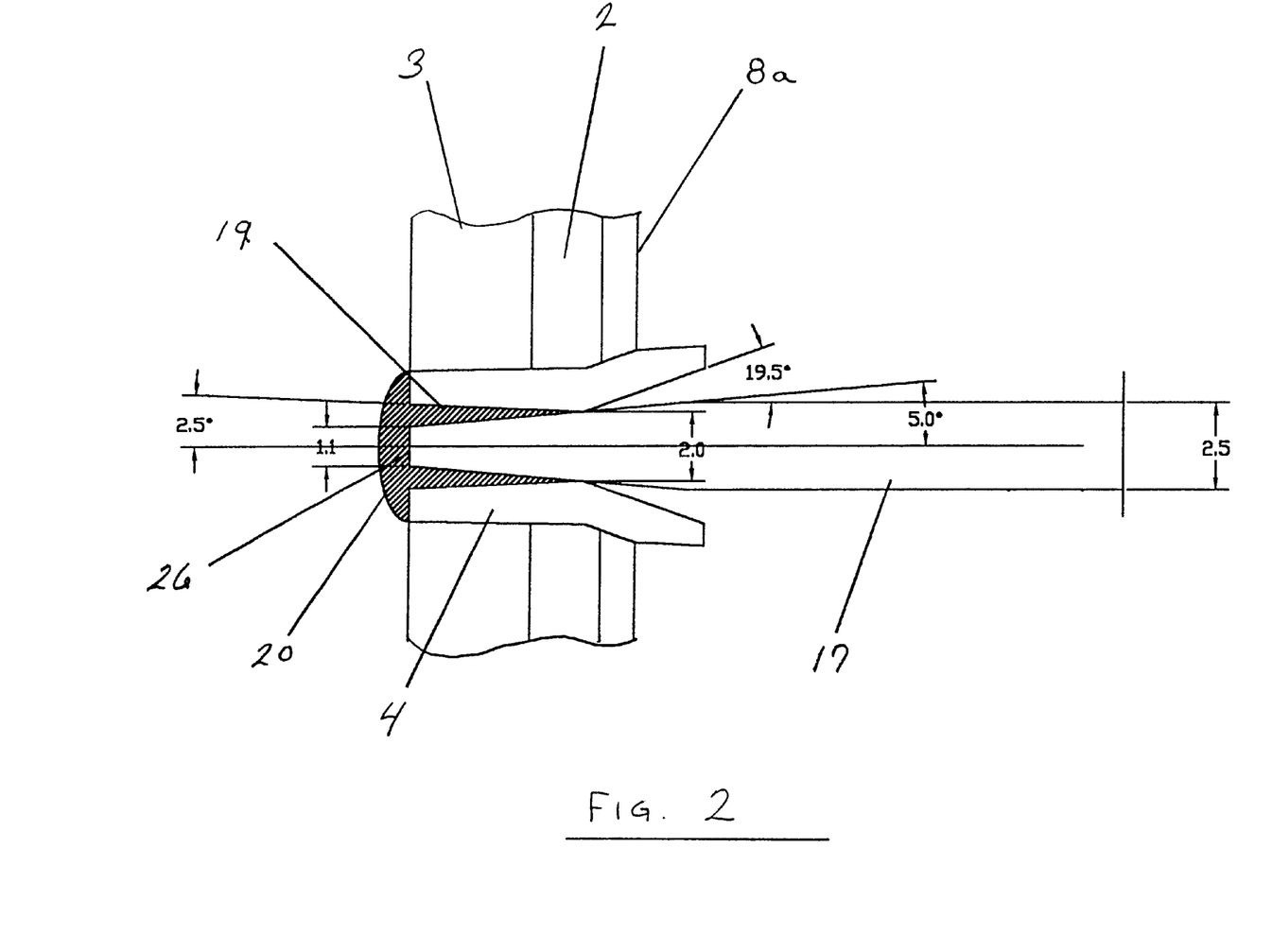
FIG. 2 is an enlarged side view of a taphole insert assembly positioned within the melt crucible of FIG. 1 and a formed basalt plug and solidified button.

The tapping rod 17 is longitudinally movable between a first position wherein the rod is positioned within the insert 4 for cooling a portion of the molten material located at a first end of the insert to form a plug 19 and stop the flow of molten material, and a second position wherein the rod is spaced from the insert to allow the plug to melt and start the flow of molten material (FIGS. 1a and 2). A cooling device conducts heat away from the molten material surrounding the rod within the taphole insert 4 to a heat transfer fluid 18. The fluid may be water, thermal oil, or any other suitable cooling fluid. The cooling device includes a passageway formed within the rod to circulate fluid 18 through the rod and a heat sink (not shown). The conduction of heat from the molten basalt within the taphole insert 4 causes the molten basalt (or metal) to solidify within the taphole insert forming a plug 19 around the tapered end of the tapping rod 17. The penetration of the tapping rod 17 to the inside surface of the taphole insert 4 and the conduction of heat through the pin causes the molten basalt in that region to solidify and form a solid button 20 on the inside surfaces of refractory and taphole insert nearest the molten bath. The continuous cooling of the rod 17 by the passing of a heat transfer fluid 18 through the tubing to a heat sink causes the basalt plug 19 and the basalt button 20 to remain intact during high temperature melting processes.

In a preferred embodiment of the present invention the tapping rod 17 is made from copper. Alternatively, the tapping rod 17 may be formed from other metals or alloys which allow conduction of heat away from the molten material 5 and to the heat transfer fluid 18. Other metals include, but are not limited to, aluminum, tungsten, titanium, or stainless steel.

The taphole insert 4 is formed from plastic refractory having the same, or similar, material composition as the working refractory 3. This allows the taphole insert 4 to be resistive of the highly corrosive molten material. The geometry of the tapping rod 17 and the taphole insert 4 are important parameters for the successful operation of starting and stopping the flow of molten material from the melt crucible 1. The tapping rod 17 preferably has a diameter of 2.5 in. and has an end 26 which is tapered to a 1.1 inch diameter at an angle of between 2 and 5 degrees, for example. While this embodiment of the tapping rod end 26 has a flat end, alternate embodiments could have a tapping rod end with a different shape, such as rounded, for example. The taphole insert 4 consists of a converging-diverging double taper in its interior. The taphole insert 4 has a 19–20° taper from the outside, or tapping machine outer housing 12 side, converging to a 2.0 inch diameter orifice within the taphole insert 4 and then a 1.5–3.5° diverging taper on the interior side, or melt crucible 1 side, of the taphole insert. Preferably, the taphole insert has a 19.5° taper from the outside and a 2.5° diverging taper on the interior side, for example. It is to be understood that the rod 17 and insert 4 may have different shapes or sizes than the configuration shown herein without departing from the scope of the invention. For example, the rod end 26 may be inserted further into the melt 5 and past the interior wall of the refractory 3 by slightly altering the geometry of the insert 4 and rod 17 to allow the formation of a thinner button 20 for faster melt of the button, and initiation of a tap stream. Preferably, the rod end 26 extends into the melt 5 a distance approximately equal to or less than the rod end 26 diameter to allow for repeated starting and stopping of the tap stream.

The tapping rod 17 is equipped on its end with an impacting device 23 to impart a shock force through the tapping rod to the basalt plug interface bond. Energizing the impactor 23 during the withdrawal sequence assures that the bond is broken and the tapping rod 17 is unrestrained for removal. In the case of a difficult to tap melt the rotating drum 14 may be rotated about axis A and indexed to a second tool position wherein a stinger pin 22 may be utilized as an alternate means to quickly penetrate a high viscosity melt plug within the taphole insert 4 and aid in the initiation of a tap stream. Additional axial tubes may be located on the rotating drum 14 to allow the addition of auxiliary tools and other diagnostic devices.

The removal of the tapping rod 17 from the taphole insert 4 with the subsequent stoppage of cooling of the basalt plug 19 and button 20 within the taphole insert 4 causes the solidified basalt button 20 to heat up from the internal heat of the molten bath and melt back into the basalt layer 5. This causes an opening to the exterior and the initiation of a molten basalt tap stream through the tap insert 4 and into a tapping chamber 7. The stream exits the tap insert 4 into the tap chamber 7 horizontally and bends to vertical due to gravity, thereby exiting the tap chamber vertically downward through a melt exit port 7c. The tap chamber 7 is filly enclosed on the lateral and vertically upward surfaces. A tap canister may be docked and sealed to the melt exit port 7c of the tap chamber 7 to complete the enclosure.

Figure 3:
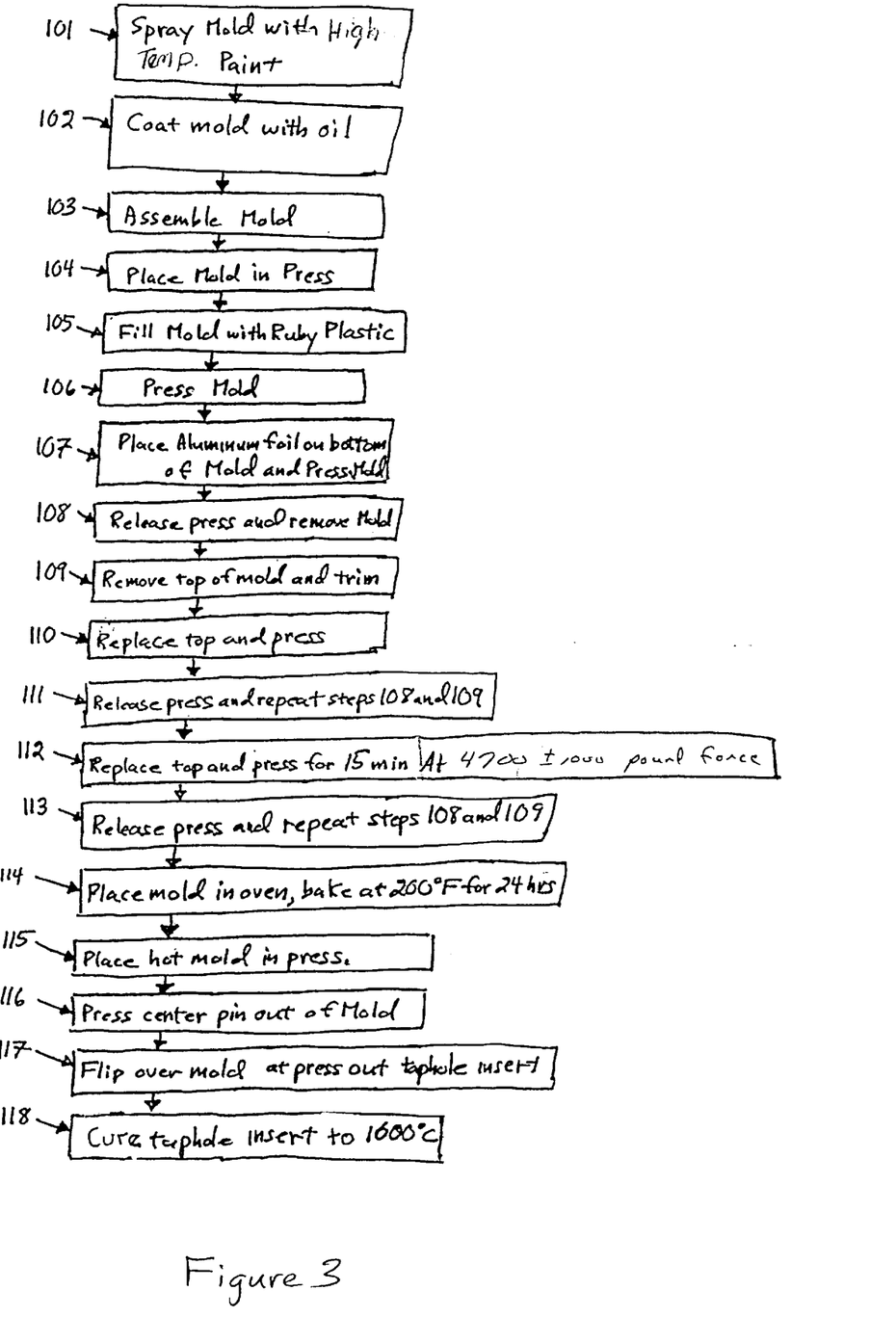
FIG. 3 is a flow diagram of a process for forming the taphole insert of FIG. 2.
Figure 4:
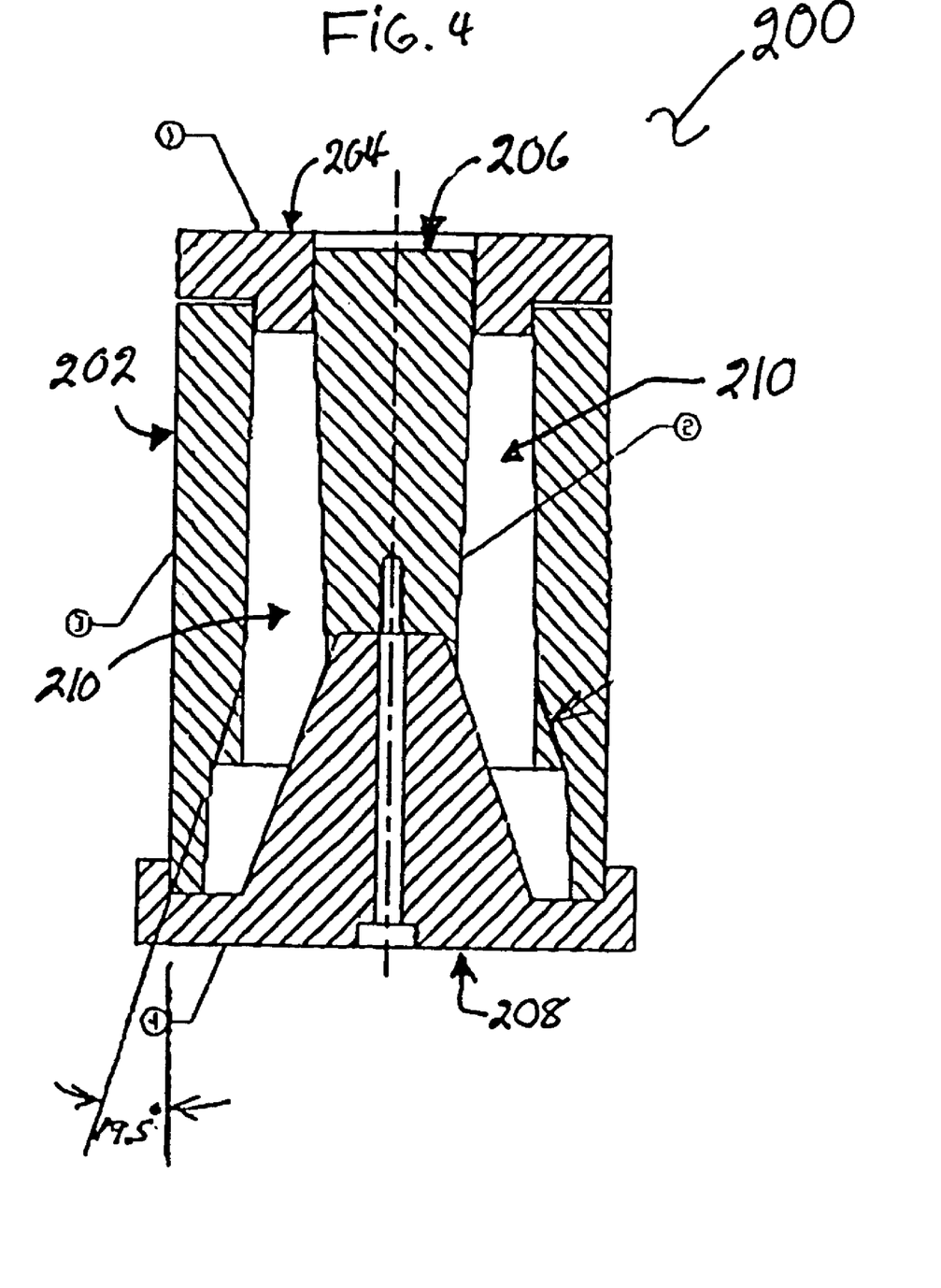
FIG. 4 is a cross-sectional view of an assembled taphole mold used in forming the taphole insert of FIG. 1b.

FIG. 3 is flow chart illustrating a preferred process of forming a taphole insert from a high alumina-chrome plastic refractory material. FIGS. 4 shows a mold 200 for use in forming the taphole insert 4 shown in FIGS. 1a and 2. The mold comprises a mold body 202, bottom 204, center pin 206, and top 208. The taphole insert 4 is formed in the interior space 210 of the assembled mold 200.

The procedure for forming the taphole insert is as follows. A mold free of particulate or other materials is sprayed on its interior molding surfaces with a high temperature stove paint at step 101. If any particulate or plastic refractory material from a prior molding is on the molding surfaces, they should be removed prior to step 101. The paint is allowed to dry fully. At step 102 a generous coat of oil (such as vegetable oil) is applied to all internal surfaces of the mold. The parts of the mold are then assembled at step 103. The mold top 208 is mated to the mold center pin 206 with mating self-aligning surfaces and bolted together with the remaining mold 200 and are held together by aligning geometry. At step 104 the assembled mold is then placed in a standard press. The mold is then filled with a high alumina-chrome plastic refractory material at step 105. The filled mold is then pressed at step 106 until the body of the mold rebounds approximately 1/16 inch. At step 107 aluminum foil is placed on the bottom of the mold 200 and the mold is then pressed again. At step 108 the press is released and the mold 200 is removed from the press. At step 109 the top 208 is removed and any material protruding from the top is trimmed with a knife or other such instrument, thus leaving the material in the mold 200 flush with the top of the mold. At step 110 the top 208 of the mold is replaced and the mold is placed in the press and pressed. The press is held for approximately 15 minutes at about 3700–5700 $lb_f$. At step 111 the press is released and the steps 109 and 110 of removing and trimming are repeated. At step 112 the top of the mold is replaced and the mold is placed in the press and pressed. The press is held again for approximately 15 minutes. At step 113 the press is released and the steps 109 and 110 of removing and trimming are repeated. At step 114 the mold 200, with the top 208 removed, is placed in an oven with the surface of the mold where the top was removed, facing up. The mold 200 is cooked in the oven at a temperature of 200° F. for approximately 24 hours. At step 115 the hot mold 200 is removed from the oven and placed in a press. At step 116 the center pin 206 is pressed out of the mold 200 while the mold is still hot. At step 117 the mold is flipped over and the taphole insert 4 is pressed out. This is done while the mold 200 is still hot. At step 118 the taphole insert 4 is placed in an oven and cured to 1600° C. This takes approximately 12 hours.

Figures 5A, 5B:
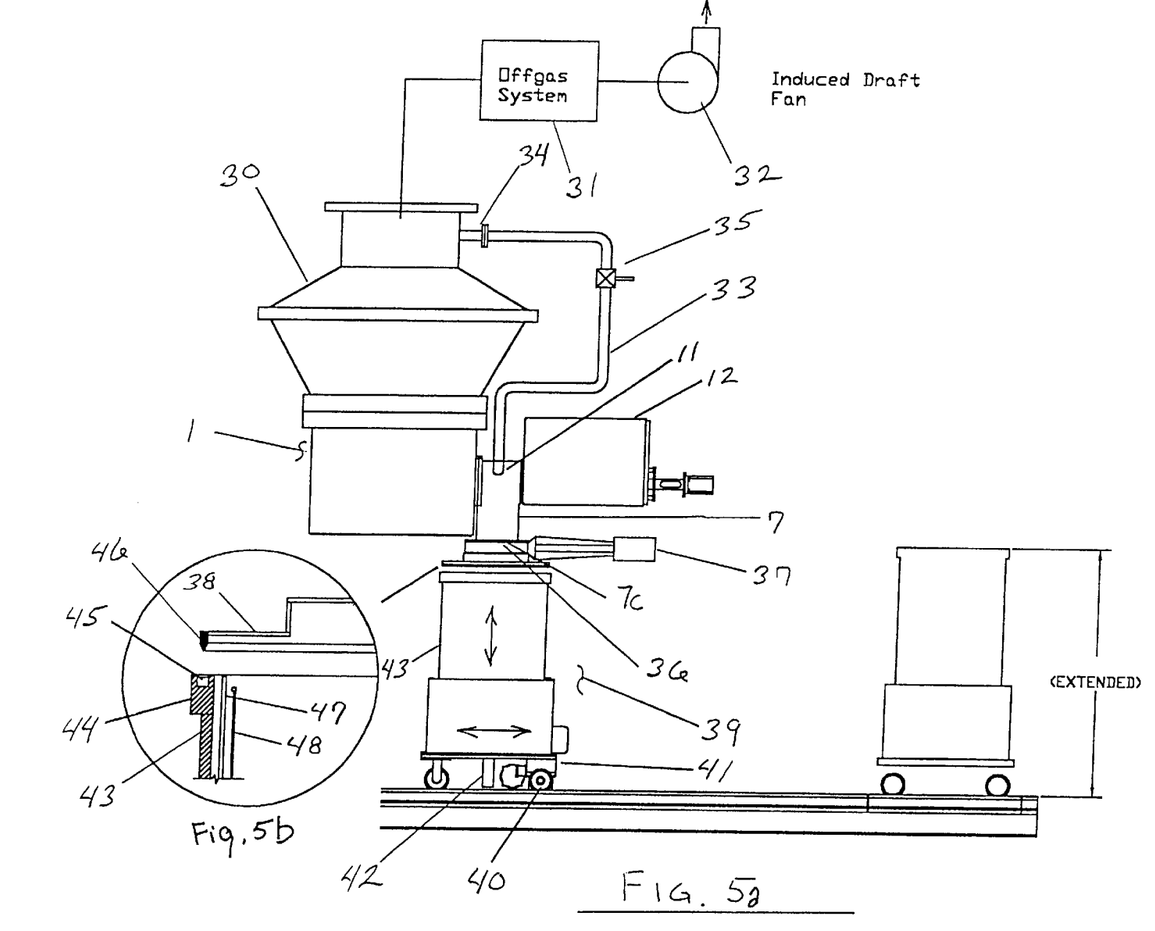
FIG. 5a is a schematic of a tapping system of the present invention.
FIG. 5b is an enlarged view showing the interface between the tap chamber and a tap canister.

FIG. 5a shows a tapping system of the present invention. The melt crucible 1 is attached to a melt upper chamber 30 from which gases are drawn into an off gas cleansing system 31 via means of an induced draft fan 32. A vacuum duct (conduit) 33 is attached at the tap chamber vacuum port 11 to the melter upper chamber 30 at a port 34. The vacuum port 11 and duct 33 withdraw fugitive emissions from the chamber and transfer the emissions to negative pressure areas of the melt container 1, thus enabling equalization of pressure in the tapping chamber to the melter pressure to aid in initialization of a molten tap stream. The induced draft fan creates a slight vacuum, which is controlled in the range of –0.5 to –10 inches of water column within the melter internal assembly. This slight vacuum draws fugitive emissions into the off gas cleansing system prior to being exhausted from the induced draft fan. An isolation valve 35 is disposed in the duct 33 to isolate the tapping chamber from the melter internals when necessary or desired.

A tapping chamber isolation valve 36 is affixed to the exit 7c of the tapping chamber 7. This isolation valve 36 is actuated via an air cylinder 37 and controlled via an electric solenoid valve similar to the operation of the tapping rod 17 described above. A canister docking seal flange 38 (FIG. 5b) is bolted to the isolation valve 36 to allow docking and undocking of a movable tap canister cart (holding tank) 39. The tap canister cart 39 is transportable horizontally via means of flanged track wheels 40 driven by an electric motor/gearbox 41. The canister is vertically raised and lowered via means of an electric motor leadscrew 42. The tap canister cart 39 has a heavy walled steel safety canister 43 affixed to the vertical drive 42. At the top of the heavy walled canister is a flange section 44 which contains a compressible high temperature seal 45. At the vertical docking of the tap canister, the seal 45 is mated with the seal flange 38 at edge 46 for completion of a closed tapping system. Within the heavy walled canister is a removable and reusable safety canister 47 and within the removable safety canister is a disposable tapping canister. Upon opening of the vacuum duct 33, isolation valve 35, tap chamber 7, and tap canister 43 are placed under slight vacuum nearly equal to the melter vacuum. This slight vacuum withdraws any fumes or fugitive emissions occurring during the tapping process into the melt crucible upper chamber 30 for processing within the off gas cleansing system 31.

From the foregoing description, it will be evident that the present invention provides a design for a method and apparatus for the controlled opening and closure of a taphole located in the side wall of a melt vessel which allows repeated starting and stopping of a molten stream. The present invention has the advantage of allowing confinement and control of fugitive emissions. Various changes can be made in the above embodiments without departing from the spirit or scope of the following claims. It is intended that all matter contained in the above description or shown in the accompanying drawings should be interpreted as illustrative and not in a limiting sense.

Variations or modification to the design and construction of the invention, within the scope of the appended claims, may occur to those skilled in the art upon reviewing the disclosure herein. Such variations or modifications, if within the spirit of this invention, are intended to be encompassed within the scope of any claims to patent protection upon this invention.

What is claimed is:

1. An apparatus for controlling the flow of molten material from a container having a tap hole formed in a sidewall thereof, the apparatus comprising:

a tubular insert sized for insertion into the tap hole, the insert having a first end for insertion into the molten material, a second end, and a fluid passageway extending between the first and second ends;

a rod having a solid end section and receivable within the tubular insert;

a drum, said drum being rotatable about a central longitudinal axis, said rod being disposed within said rotatable drum and extending generally parallel to the longitudinal axis; and a cooling device thermally coupled to the rod to reduce the temperature of the rod below the temperature of the molten material;

the rod being longitudinally movable between a first position wherein the rod is positioned within the tubular insert for cooling a portion of the molten material located at the first end of the insert to form a plug and stop the flow of molten material through the passageway, and a second position wherein the solid end section of the rod is spaced from the first end of the insert to allow the plug to melt and start the flow of molten material through the passageway.

2. The apparatus of claim 1 wherein the rod is formed of copper.

3. The apparatus of claim 1 wherein the solid end section of the rod receivable within the insert is tapered.

4. The apparatus of claim 1 wherein the cooling device is at least partially disposed within the rod.

5. The apparatus of claim 4 wherein the cooling device comprises a passageway extending along at least a portion of the rod for circulating fluid within the rod.

6. The apparatus of claim 1 further comprising a cylinder operable to move the rod between its first and second positions.

7. The apparatus of claim 6 further comprising a control valve for controlling movement of the cylinder.

8. The apparatus of claim 1 wherein the tubular insert is formed from a high alumina-chrome refractory material.

9. The apparatus of claim 1 wherein an inner surface of the passageway of the tubular insert converges from the first end of the insert along a first portion of the insert and diverges along a second portion of the insert to the second end of the insert.

10. The apparatus of claim 9 wherein the inner surface of the first portion of the insert converges at an angle of between about 2 and 3 degrees relative to a central longitudinal axis of the insert.

11. The apparatus of claim 9 wherein the inner surface of the second portion of the insert diverges at an angle of between about 19 and 20 degrees relative to a central longitudinal axis of the insert.

12. The apparatus of claim 9 wherein the diameter of the passageway at an interface between the first and second portions of the insert is approximately equal to an outer diameter of the rod to prevent the flow of molten material from the container when the rod is in its first position.

13. The apparatus of claim 1 further comprising a pin extending generally parallel to the rod within the drum, the pin and rod being spaced equidistant from the longitudinal axis, the drum being rotatable to align the pin with the insert to expel the plug from the insert.

14. The apparatus of claim 1 further comprising a housing configured for sealing engagement with the container, the housing having a passageway formed therein for receiving the rod.

15. The apparatus of claim 14 wherein the housing has an opening formed therein for delivering the molten material from the melt container.

16. The apparatus of claim 1 wherein the solid end section has a length of at least about 8 inches.

17. An apparatus for starting and stopping the flow of molten basalt from a container having a tap hole formed in a sidewall thereof, the apparatus comprising:

- a tubular insert sized for insertion into the tap hole, the insert having a first end for insertion into the molten basalt, a second end, a fluid passageway extending between the first and second ends, said fluid passageway converging from the first end of the insert along a first portion of the insert and diverging along a second portion of the insert to the second end of the insert;
- a rod receivable within the tubular insert, said rod having a rod end and being longitudinally movable between a first position wherein the rod is disposed within the insert and the rod end extends at least to the first end of the insert, and a second position wherein the rod end is spaced from the first end of the insert;
- a cooling device thermally coupled to the rod to reduce the temperature of the rod below the temperature of the molten basalt such that when said rod is in said first position a portion of the molten basalt located at the first end of the insert forms a plug and stops the flow of molten basalt through the passageway and when said rod is in said second position, the plug melts and starts the flow of molten basalt through the passageway;
- a drum, said drum being rotatable about a central longitudinal axis, said rod being disposed within said rotatable drum and extending generally parallel to the longitudinal axis; and
- a pin, said pin extending generally parallel to the rod within the drum, the pin and rod being spaced equidistant from the longitudinal axis, the drum being rotatable to align the pin with the insert to expel the plug from the insert prior to starting flow of molten basalt.

18. The apparatus of claim 1 further comprising an impacting device coupled to a proximal end of the rod, said impacting device capable of imparting a shock force through the rod to the plug to facilitate movement of the rod into the second position.

19. The apparatus of claim 17 further comprising an impacting device coupled to a proximal end of the rod, said impacting device capable of imparting a shock force through the rod to the plug to facilitate movement of the rod into the second position.

* * * * *